US010897353B2

(12) United States Patent
Martín Rodríguez et al.

(10) Patent No.: US 10,897,353 B2
(45) Date of Patent: Jan. 19, 2021

(54) COMPUTER-IMPLEMENTED METHOD FOR GENERATING PASSWORDS AND COMPUTER PROGRAM PRODUCTS OF SAME

(71) Applicant: TELEFONICA DIGITAL ESPAÑA, S.L.U., Madrid (ES)

(72) Inventors: Ricardo Martín Rodríguez, Madrid (ES); Sergio De Los Santos Vilchez, Madrid (ES); Carmen Torrano Giménez, Madrid (ES); Antonio Guzmán Sacristán, Madrid (ES); José María Alonso Cebrián, Madrid (ES)

(73) Assignee: TELEFONICA DIGITAL ESPAÑA, S.L.U., Madrid (ES)

( * ) Notice: Subject to any disclaimer, the term of this patent is extended or adjusted under 35 U.S.C. 154(b) by 160 days.

(21) Appl. No.: 16/094,519

(22) PCT Filed: Apr. 19, 2016

(86) PCT No.: PCT/ES2016/070275
§ 371 (c)(1),
(2) Date: Oct. 18, 2018

(87) PCT Pub. No.: WO2017/182679
PCT Pub. Date: Oct. 26, 2017

(65) Prior Publication Data
US 2019/0123898 A1    Apr. 25, 2019

(51) Int. Cl.
*H04L 9/08*        (2006.01)
*H04L 9/32*        (2006.01)
(Continued)

(52) U.S. Cl.
CPC .......... *H04L 9/0863* (2013.01); *H04L 9/0643* (2013.01); *H04L 9/0861* (2013.01);
(Continued)

(58) Field of Classification Search
None
See application file for complete search history.

(56) References Cited

U.S. PATENT DOCUMENTS 8,381,272 B1    2/2013  Nelson et al.
2010/0313248 A1  12/2010  Krivosheev et al.
(Continued)

OTHER PUBLICATIONS

Houshmand, Shiva, and Sudhir Aggarwal. "Building better passwords using probabilistic techniques." Proceedings of the 28th Annual Computer Security Applications Conference. 2012. (Year: 2012).*

(Continued)

*Primary Examiner* — Madhuri R Herzog
(74) *Attorney, Agent, or Firm* — Sughrue Mion, PLLC

(57) ABSTRACT

The invention relates to a computer-implemented method for generating passwords and to computer program products of same. The method comprises: accessing, by a user (100), by means of a first computation device (200), for the first time, a webpage or website identified by a web domain that requires the Identification of the user (100) on the webpage or website; and generating, by means of a password generator, a password required by the webpage or website, based on the use of a result obtained from the execution of a cryptographic function using password policies related to the domain, the use of a master password (101) known only to the user (100) and the use of an Id_Hash (208).

12 Claims, 4 Drawing Sheets

(51) Int. Cl.
*H04L 9/12* (2006.01)
*H04L 29/06* (2006.01)
*H04W 12/06* (2009.01)
*H04L 9/06* (2006.01)

(52) U.S. Cl.
CPC .............. *H04L 9/12* (2013.01); *H04L 9/3226* (2013.01); *H04L 9/3228* (2013.01); *H04L 9/3247* (2013.01); *H04L 9/3263* (2013.01); *H04L 63/083* (2013.01); *H04W 12/0608* (2019.01)

(56) References Cited

U.S. PATENT DOCUMENTS

| 2015/0026341 A1* | 1/2015 | Blacka .................. H04L 63/168 709/225 |
| 2016/0255088 A1* | 9/2016 | Kaplan .................. H04L 63/08 726/7 |

OTHER PUBLICATIONS

Halderman, J. Alex, Brent Waters, and Edward W. Felten. "A convenient method for securely managing passwords." Proceedings of the 14th international conference on World Wide Web. 2005. (Year: 2005).*

Lei, Ming, et al. "A virtual password scheme to protect passwords." 2008 IEEE International Conference on Communications. IEEE, 2008. (Year: 2008).*

International Search Report for PCT/ES2016/070275 dated Dec. 21, 2016.

* cited by examiner

COMPUTER-IMPLEMENTED METHOD FOR GENERATING PASSWORDS AND COMPUTER PROGRAM PRODUCTS OF SAME

CROSS REFERENCE TO RELATED APPLICATIONS

This application is a National Stage of International Application No. PCT/ES2016/070275 filed Apr. 19, 2016.

APPLICATION FIELD

The present invention concerns a computer-implemented method, and computer program products, for generating passwords that are strong and unknown to the user, and that only work on a website that is suitable and validated as secure.

BACKGROUND OF THE INVENTION

The secure use of passwords has always been a challenge in security. Passwords protect the "online assets" of users from other illegitimate users. Adequately safeguarding them is fundamental for keeping the service secure or secret. The main problems in using a password, or the challenges that users face in properly managing them, are:
  Preventing the reuse of different passwords for each service. This is fundamental so that, when faced with a possible disclosure of information, all the services of a user are not compromised.
  Use of secure passwords. Using predictable, simple or deducible passwords does not provide real security.
  Keeping the passwords secret. The user themselves can disclose them consciously or unconsciously.
  Resisting social engineering attacks, in particular, phishing. A good amount of passwords are revealed by the users themselves because they are not conscious that they are introducing them in a place that is not secure.

In order to solve the problem of user password management, there are password managers on the market which enable as many passwords as desired to be stored in a secure manner (encrypted), accessing them through a single master password and generating secure passwords.

There are three fundamental ways to manage the password and, with them, a good portion of the digital identity.
  Manual: The user usually manages a series of passwords that they use in a limited number of services. Passwords are usually used that are easy to remember and write and are usually repeated among the different services. This implies the use of weak passwords (so they can be remembered) and even normally implies that they are predictable. On the other hand, they are not usually stored. Saving the keys in this stage can result in insecure storage (plain text).
  Local management: The user manages their passwords through a local manager. Password management programs usually take care of the neglected aspects of the manual management process. Through a master password, they open a file (encrypted) where the rest of the passwords are stored. Apart from this basic functional nature, they usually enable the generation of secure and different passwords for each service.
  This frees the user from the most uncomfortable aspects of the management of the passwords. To this end, there are several programs that meet this goal: PasswordSafe, KeePass and 1Password are considered the most well-known and used. These solutions are usually open code, multiplatform and manage all the aspects related to the passwords, from generation to secure storage. The master password is not stored, but is rather used for the decryption (usually synchronous) of the file with the rest of the passwords.
  However, they are solutions fundamentally intended for local use, and they lack synchronisation. In other words, the user must carry the encrypted file with the passwords with them, open it with the master password, and thus be able to use the passwords in a traditional manner. In some cases such as 1Password, the program includes a feature for performing the synchronisation through third parties; however, this is not a real synchronisation of the password system, but rather an additional comfort so the user can have their set of keys in different places.
  Management in the cloud: In order to alleviate this synchronisation problem, other products have appeared such as LastPass, Dashlane or Encryptr. They are usually used as a multiplatform or integrated in the form of a plugin for the browser (this is not the case of Encryptr). The main advantage thereof is the synchronisation, given that the relevant information is stored in the servers of each product. Since it is such sensitive information, the storage is based on a zero-knowledge policy regarding what is stored. This is usually solved by storing the completely encrypted contents in the server, and decrypting them in the client. Even so, this system can create doubts regarding a single (encrypted) password repository which converts it into the only weakness thereof. Furthermore, the synchronisation services, whether integrated or using third-party services, require the service to be joined to the user in some way, either as users of the very service or by signing up (registration) as a user in the very platform. An attacker with access to the email of the victim could be able to retrieve the password of the service through the email. In any case, the data is able to be attributed to the user and is stored in the server of a third party.
A weakness that all the systems have in common is:
  In the case of the systems with synchronisation, they require the use of third-party storage systems, wherein (despite being encrypted) sensitive information is stored or it may be related to the user.
  They do not integrate any solution where the password is introduced in the correct domain and not phished. Although the password is generated and stored in a secure manner, if it is introduced in the wrong form controlled by the attacker, it becomes completely exposed.
  All the systems are completely based on the knowledge of a master password. With access to this password, any other password stored in the same system could be accessed.

DESCRIPTION OF THE INVENTION

Exemplary embodiments of the present invention contribute, according to a first aspect, a computer-implemented method for generating passwords, wherein a user accesses by means of a first computation device, for the first time, a webpage or website identified by a web domain that requires the identification of said user on said webpage or website by means of credentials including a user identifier and a password.

The proposed method comprises generating said password required by the webpage or website by performing the following steps:

intercepting, by said first computation device, when the user accesses said webpage or website;

retrieving, by the first computation device, information referring to said web domain and said user identifier;

generating, by the first computation device, a local signature, i.e., within the same environment, which identifies the domain that possesses the requested resource, or also referred to as the local Domain Signature;

checking, by the first computation device, if there is already a record for said web domain and for said user identifier in a database thereof, and checking if a cryptographic value, or Id_Hash (208), is different from zero (in other words, this cryptographic value is checked in order to be able to determine when a new password must be generated);

sending, by the first computation device, if the result of said check was false, information referring to the web domain and the user identifier to a remote server, so that the latter may generate a Domain Signature for that web domain;

receiving, by the first computation device, from said remote server, the generated Domain Signature and generating a random value for said cryptographic value, or Id_Hash; and checking, by the first computation device, that the Domain Signature received from the remote server matches the local Domain Signature generated previously, and if they match, generating a necessary input so that a password generator module generates the password required by the webpage or web service by means of performing the following actions:

i. requesting, by the first computation device, that the user introduce a master password, or Master-Pass, into the first computation device;

ii. executing, by the first computation device, a cryptographic mathematical function on the user identifier, the web domain identifier, the Id_Hash, the local Domain Signature and the requested Master-Pass, resulting in an encrypted value that is concatenated with password policies related to the cited domain;

iii. sending, by the first computation device, the information resulting from said concatenation to said password generator module so that the latter may generate the password required by the webpage or website by implementing a computational algorithm that uses the Master-Pass and the Id_Hash; and iv. receiving, by the first computation device, the password generated by the password generator module and directly, without storing it, inserting it into the webpage or website.

Thus, the generation of the password for the cited webpage or website implies the incorporation of steps intended to detect any attempt at spoofing the domain for which it is generated. Furthermore, the generation of the password is performed such that it prevents the user from using passwords already defined for other services or from generating passwords that are not robust. To do so, the user only needs to set the Master-Pass, and with that and the information needed to protect the user from domain spoofing attempts, the proposed method generates different passwords for all the services that will be accessed by the user.

In an exemplary embodiment, the mentioned password generator module is included in the remote server. Alternatively, in another exemplary embodiment, the cited password generator module is included in a dedicated computation program that is executed in the first computation device.

According to the present invention, the password policies related to the cited domain include a minimum length that the generated password must have in relation to the number of uppercase and lowercase letters and/or number of digits and/or number of non-alphanumeric characters.

Likewise, according to the present invention, the password policies related to the cited domain can be retrieved directly from the very domain, or alternatively they can be defined by the very user, or they can even be configured by the first computation device and stored in the database thereof.

In a preferred exemplary embodiment, the cited computation algorithm generates a binary cryptographic function, or Meta-Pass, starting from the combination of the Master-Pass and the Id_Hash and the mapping of bits that make up the Master-Pass with characters associated with the password policies regarding the cited domain.

Furthermore, according to said exemplary embodiment, the cited computation algorithm can include random characters on a result obtained by said mapping in order to obtain a password that meets a predetermined length according to said password policies regarding the cited domain, and it can mix the characters that make up said password with a predetermined length.

In an exemplary embodiment, the cited step iv) further comprises storing, by the first computation device, in the database and associated with the user identifier and the web domain identifier, the Id_Hash associated with the credentials of the user for the webpage or website.

Likewise, the proposed method includes a synchronisation protocol so that the user may manage their passwords from different computation devices. To this end, in an exemplary embodiment, the proposed method further comprises:

accessing, by the user, the webpage or website with a second computation device, wherein said second computation device is synchronised with the first computation device by introducing a one-time password, or OTP, into the second computation device, said OTP having been generated previously by the remote server;

sending, by the second computation device, the OTP to the remote server so that the latter may perform the validation thereof;

receiving, by the second computation device, if the result of said validation was correct, an encrypted message from the remote server, wherein said encrypted message includes said OTP and data associated with the webpage or website encrypted by means of the use of the Master-Pass, and wherein said data includes the user identifier, the web domain identifier and the Id_Hash; and requesting, by the second computation device, that the user introduce the Master-Pass in order to decrypt the contents of said encrypted message.

In yet another exemplary embodiment, when the user, by means of the first computation device, accesses the webpage or website for a second time, the proposed method by means of the use of the first computation device comprises:

intercepting said second access to the webpage or website and retrieving the information referring to the web domain and to the user identifier;

generating a new local Domain Signature for the web domain and comparing said local Domain Signature generated with the previously generated local Domain Signature;

checking if there is already a record for said web domain and for said user identifier in the database and also checking if the Id_Hash is different from zero;

if the result of said checking was true, requesting that the user introduce the Master-Pass into the first computation device;

executing a cryptographic mathematical function on the user identifier, the web domain identifier, the Id_Hash, the local Domain Signature and the requested Master-Pass, resulting in an encrypted value that is concatenated with the password policies relating to the cited domain; and sending the information resulting from said concatenation to the password generator module so that the latter may generate the password required by the webpage or website.

Other embodiments of the invention that are disclosed in the present document also include computer program products for carrying out the steps and operations of the method proposed in the first aspect of the invention. More specifically, a computer program product is an embodiment which has a computer-readable medium including computer program instructions coded therein that, when executed in at least one processor of a computer system, cause the processor to perform the operations indicated in the present document as embodiments of the invention.

Thus, the present invention provides a method of generating passwords that are strong and unknown to the user (which prevents them from being disclosed) and that only work on a website that is suitable and validated as secure, such that it prevents the permanent storage of the passwords in a cloud service or locally.

The definition of the proposed architecture enables the password generator to be located in its own server or in a third-party server.

Likewise, the present invention provides an entirely portable solution, which can be integrated with any browser from anywhere and which defines an API that ensures that the service can be used away from the browser.

BRIEF DESCRIPTION OF THE DRAWINGS

The previous advantages and features, in addition to others, shall be understood more fully in light of the following detailed description of exemplary embodiments, which must be taken by way of illustration and not limitation, with reference to the drawings attached, wherein.

DETAILED DESCRIPTION OF AN EXEMPLARY EMBODIMENT

Figure 1:
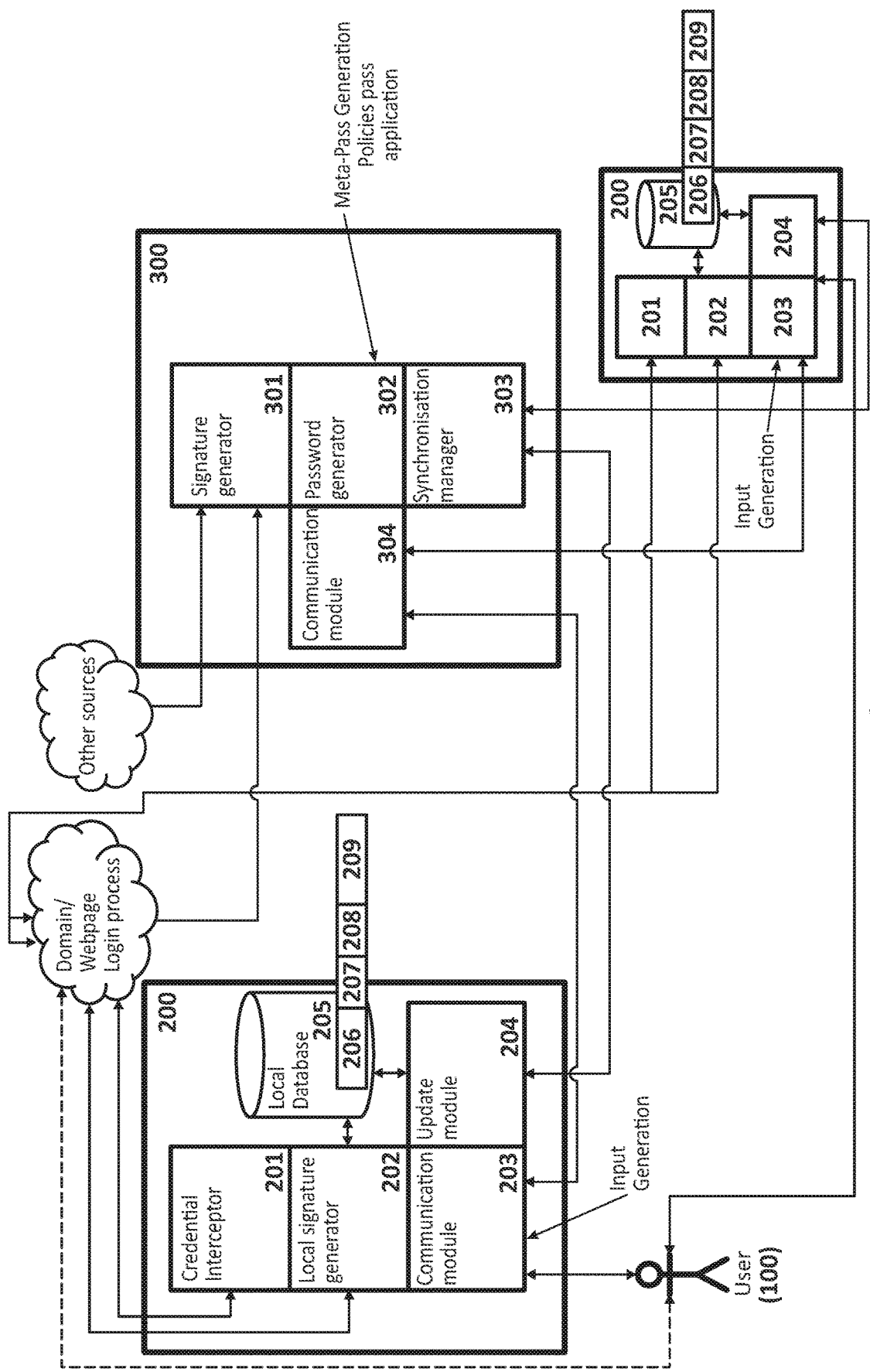
FIG. 1 schematically illustrates the components that can make up part of the proposed system for generating passwords.

FIG. 1 shows a preferred exemplary embodiment of the modules/elements of a system proposed by the present invention for generating passwords. The figure shows the user 100 who interacts with a machine of the user or first computation device 200, for example a user equipment (UE). Likewise, in the figure a remote server 300 accessible by Internet is illustrated.

The system is proposed in order to ensure the portability of the proposed method and the integration of multiple UEs from which the user 100 will be able to manage their passwords. To do so, the different modules of the system facilitate the synchronisation of the local information. In this architecture it is assumed that the user 100 is the only one who knows the master key (Master-Pass 101).

According to this exemplary embodiment, the UE 200 includes:

A Credential Interceptor module 201: This module is configured to intercept the insertion of credentials on webpages. Likewise, this module can detect when the user 100 is visiting a page that is susceptible to needing a password managed by the system.

A local database 205: It stores the information relating to each of the web services for which the generated password is to be protected. The information that will be stored in the cited local database 205 will be:

1. Username 206 (or user identifier): Identifies the user 100 for the service housed in the domain. Enables the use and management of different usernames in the same domain, even though they belong to the same person.

2. Domain 207 (or web domain identifier) for which the password is generated.

3. Id_Hash 208: Cryptographic value which, combined with the Master-Pass 101, enables the suitable password to be generated for each domain. If it is desired that the password for a specific domain and user be changed, it will only be necessary to change this data.

4. Password Policies 209: Policy related to the features of the generated password. This ensures that the proposed methodology generates strong passwords. These policies include the password size, in addition to the minimum number of elements that the password must contain in relation to the number of uppercase and lowercase letters, number of digits and number of non-alphanumeric characters. When possible, the policies are retrieved from the domain. If the domain does not have a defined password policy or the automatic retrieval thereof is not possible, the user can introduce these values manually. In any case, if there is no explicit definition of these policies, the present invention provides a default policy to ensure the strength of the generated passwords.

A local domain signature Generator module 202: This module is configured to enable the domain signature to be obtained, hereinafter referred to as Domain Signature (hash of the certificate) of a given domain and which compares it to the one stored in the database 205. The Domain Signature mitigates MitM (Man in the Middle) attacks wherein the TLS certificates have been compromised or modified. This value will store the information needed to identify the place visited. If the user intends to make use of the password generator in a domain suspected of not being protected with the "usual" cryptographic information, the system will warn them.

A Communication module 203: This module is configured to retrieve and enable the sending of the information needed for the remote server 300 to be able to securely generate the Domain Signature associated with a given domain, during the generation of the credentials. This module will make it possible to securely request a password to the user 100 which will act as a master key and will enable the input of the system to be generated without compromising the information that identifies the user 100. For example, the cryptographic functions of hashing can be used to produce a chain, the knowledge of which makes it impossible to deduce the information that was used to generate it, but that will be different from other chains generated starting from different information. Then a hash is generated starting from the concatenation of the User identifier 206, Web domain identifier 207, Id_Hash 208, and the Master-Pass 101. The data structure is added to this which illustrates which minimum policy is associated with the password established by the user 100. The hash and the policy are called input. This module sends the input to the remote server 300 and waits to receive the generated password.

An Update module 204: This module ensures that, in the case of the user 100 using several UEs 200, the information between them all is coherent.

Moreover, the remote server 300 includes:

A Communication module 304: This module is configured to facilitate communication with the clients by receiving requests to generate the Domain Signature of passwords and sending the results of both processes.

A signature generator module 301: This module is configured to generate, if possible, the Domain Signature of a given domain.

A password generator module 302: This module is configured to generate the password requested by the user 100. This module receives the input sent by the client 100 as an entry.

A Synchronisation manager module 303: This module enables the information to be updated between several UEs 200 managed by said user 100. This will enable, for example, the user 100 to be able to manage their passwords from different computation devices, for example a PC, a mobile phone, a tablet, etc.

The distribution of the modules shown in FIG. 1 can be altered. Specifically, instead of including the password generator module 302 in the remote server, in other alternative exemplary embodiments and in this case not illustrated, it is included in a dedicated computation program that is executed in the UE 200.

Figure 2:
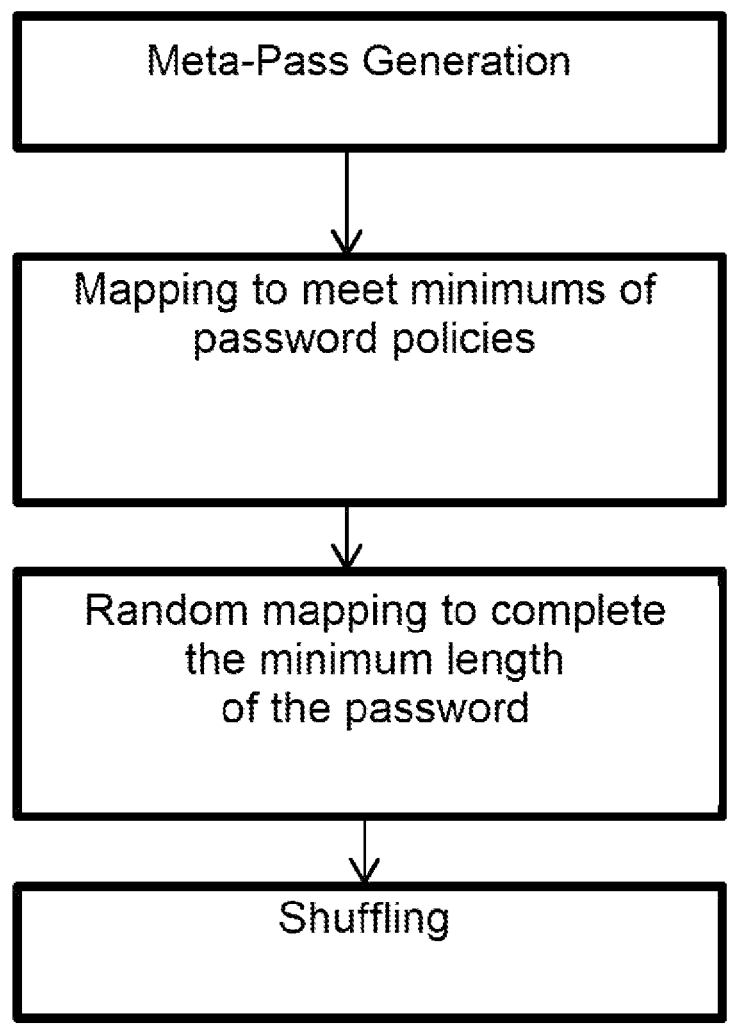
FIG. 2 schematically illustrates the sequence of steps implemented by the invention in order to generate a strong password starting from an input received from a user.

Now referring to FIG. 2, an exemplary embodiment for generating the password by the password generator module 302 is shown. Firstly, a Meta-Pass is generated consisting of a hash represented in binary format generated from a combination of the Master-Pass 101 and the Id_Hash 208. To generate the password of the service, the bits of the Meta-Pass (as many as necessary to meet the length requirements of the password) are mapped to different predefined charsets parameters. Charsets are defined for characters of different types: lowercase alphabetic characters, uppercase alphabetic characters, digits and non-alphanumeric characters. For the mapping, first it is ensured that the password meets the minimum policy established by the user 100 with respect to the type of the characters that it contains. To do so, the first bits of the Meta-Pass are mapped to the corresponding charsets based on the criteria established in the policy. For example, if the policy establishes that the password must contain at least two digits and a non-alphanumeric character, the first bits of the Meta-Pass would be mapped to these charsets in order to generate the indicated characters.

Once the minimum requirements of the password are ensured, the rest of the password is completed with characters chosen randomly until the indicated length is completed (if necessary). To do so, a pseudo-random number generator (PRNG) is used, which determines to which charset the rest of the generated characters must be mapped. As a seed of the pseudo-random number generator a selection of the first bits of the received input can be used.

Finally, all the characters are shuffled in order to ensure the strength of the generated password. The final result is the password generated for the domain, which the communication module 304 will send to the client 100.

Figure 3:
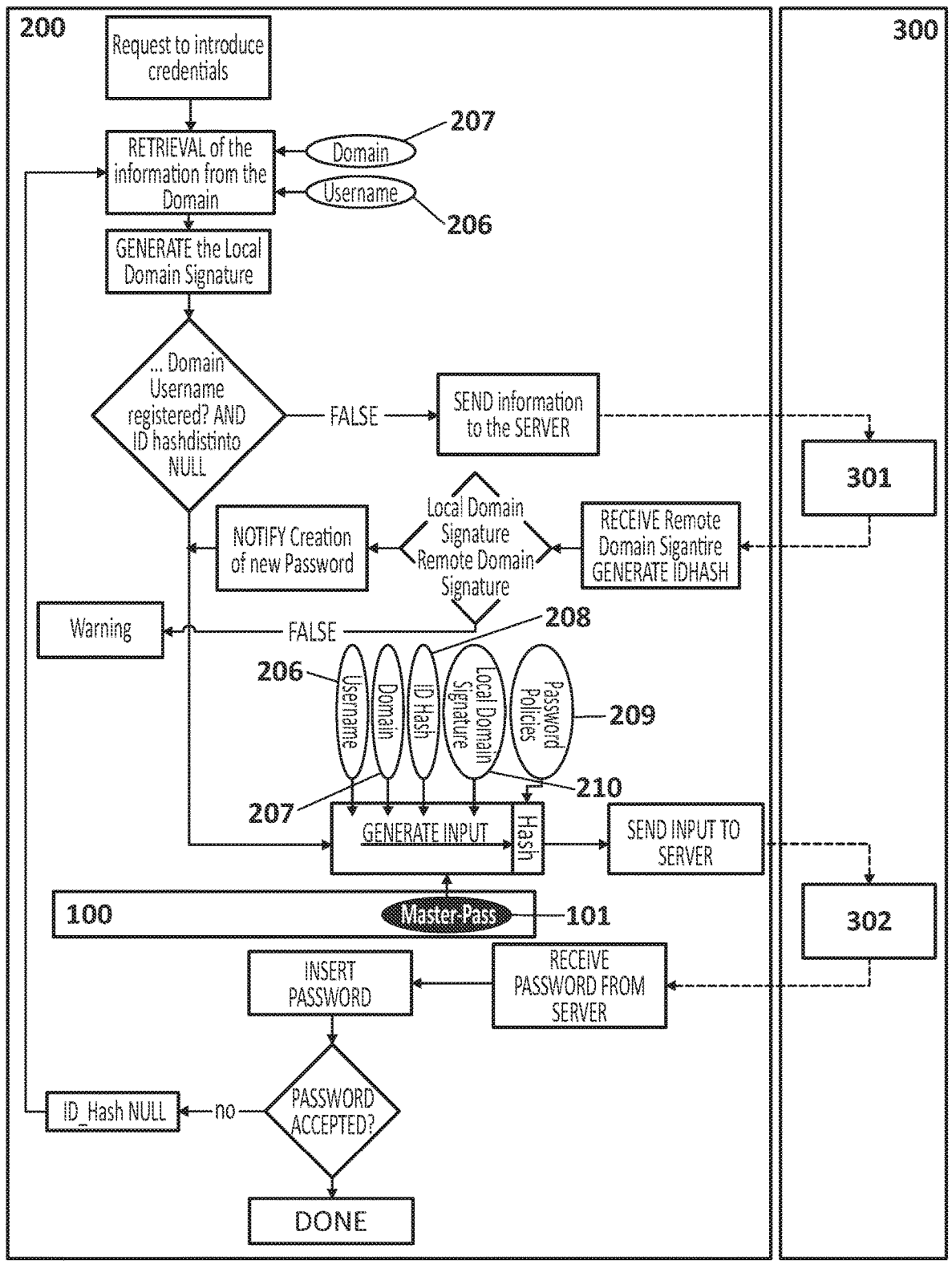
FIG. 3 is a flow chart which schematically illustrates the flow of data of the proposed method for generating passwords.

Now referring to FIG. 3, wherein an exemplary embodiment of the proposed method is shown.

Starting from the flow chart of FIG. 3 it is possible to describe four different events defined for the password management: the generation of a new password, the use of an already generated password, a password change and the revocation or expiry of the certificate of the domain.

Generation of a new password:

When a user 100 interacts with a web service that requests them to be identified with a username and a password, they will be able to use the proposed invention to generate a password preventing the reuse of previous passwords. Furthermore, this password will be generated starting from reliable information that identifies the domain, such that it is possible to detect if the user is a victim of phishing attacks. Finally, the use of this invention will enable the password to be introduced as long as it is requested automatically without the password needing to be stored anywhere.

Initially Id_Hash 208 takes on the value of zero (NULL). According to the diagram of FIG. 3, once the insertion of the password is intercepted, the module responsible for obtaining the parameters that profiles each domain locally, i.e. the local signature generator 202, will need to retrieve the information that is necessary to identify the domain. With this information, the local Domain Signature 210 is generated.

After this, it is checked if there is already a corresponding record for this domain and this username and, furthermore, if Id_Hash 208 is different from NULL. If these conditions are not met, the necessary information is sent to the remote server 300 to generate the Domain Signature. In the remote server 300, the signature generator module 301 identifies the domain and compares the information retrieved by the user 100 with the information retrieved from reliable sources. This process will be explained later in this document. The result of the process is a signature that determines which information legitimately identifies the domain (Domain Signature). This Domain Signature is sent to the UE 200, which generates a random value for Id_Hash 208. Then it is checked if the Domain Signature received from the remote server 300 (which is reliable) corresponds with the local signature 210. If this is not the case, an error warning is given. If both match, the user 100 is notified that a new password will be created so that they check that they are on the suitable webpage and the process is continued. The UE 200 executes a hashing function on the following data: User identifier 206, Web domain identifier 207, Id_Hash 208, local Domain Signature 210 and the Master-Pass 101 requested explicitly from the user 100. To the resulting hash the information relating to the password policy 209 defined for this domain is concatenated and is sent to the remote server 300. The remote server 300, as explained previously, generates a key for this domain and sends it to the UE 200. However, this key is not stored, but is rather directly introduced in the webpage from which the credentials are requested from the user 100 in order to register a new password. They do, however, store the data that identifies the user 100 for this domain (User identifier 206), the very domain (Web domain identifier 207) and the cryptographic value that will differentiate this record from other ones (Id_Hash 208). The storage of this data is not considered dangerous and prevents the password from being stored. If the password fails, a password change is forced for which Id_Hash=NULL is introduced and it returns to the point of the process wherein the domain information is retrieved.

Use of the already generated password:

Each time the user 100 needs to introduce the password in an authentication process they will need to request that the password be generated by the system. The goal of this document is not to enter into specific aspects of the implementation, since for each platform or underlying technology these aspects will be slightly different. When the password is requested, the information relating to the user 206 and the Web domain identifier 207 is retrieved and the local Domain Signature 210 is generated. It is then checked if this password has been generated previously. This means that there is a record that identifies the Web domain identifier 207, the user for this domain 206 and a value that distinguishes this record from others (Id_Hash 208). Like the password that had been generated previously, the Domain Signature used in this case comes from the UE 200 and not from the signature generator module 301. Afterwards, the generation of the password is then requested. To do so, the result of executing a hashing function on the following data is sent: User identifier 206, Web domain identifier 207, Id_Hash 208, local Domain Signature 210 and the Master-Pass 101 requested explicitly from the user 100. To the resulting hash the information relating to the password policy 209 defined for this domain is concatenated and is sent to the remote server 300. The remote server 300 will generate a key for this domain and it will be sent to the UE 200. When the UE 200 receives the password, it will complete the authentication process. If this process fails it could be a symptom that the domain has been compromised or that the certificate has been revoked/has expired. To do so, the password change is forced, setting Id_Hash=NULL before continuing the process.

Password change:

As commented previously, the regeneration of a password for a specific website will only imply the change of Id_Hash 208. When the generation of a new password is requested, the UE 200 will substitute the value stored in the field Id_Hash 208 with NULL. If the user 100 uses more than one UE 200 compliance will be forced with the synchronisation protocol designed to guarantee the coherence of the information between all the nodes.

Revocation or expiry of the certificate of the domain:

When the insertion of the password causes an error, it can be due to three factors:

A mistake in the insertion of the master password.

That the certificate of the domain has been revoked or has expired.

That the domain is trying to be spoofed.

In this case, the present invention provides an iterative use of the flow defined in FIG. 3 and the definition of a data structure that enables successive checks to be performed. The sequence to be implemented would be to first request that the user 100 introduce their master password (Master-Pass 101) again. The modules that would illustrate this second introduction of the master password are not illustrated in FIG. 3 for the sake of simplicity. The implementation would require a counter associated with each domain, which would be set to zero in each of the password generations. If this fails, secondly, a password change is forced. This implies setting the Id_Hash field 208 to NULL and restarting the process from the beginning. This would require the Domain Signature associated with the domain to be retrieved in a legitimate manner and which would be compared to the one obtained locally 210. If this comparison highlights any difference it can conclude that the domain was the victim of a spoofing attack.

According to the present invention, to generate the Domain Signature, the remote server 300 assumes the responsibility of generating the passwords associated to domains, in addition to protecting the confidentiality of the users, enabling them to be protected from the theft of these credentials based on the spoofing of websites (phishing attacks). To do so, the signature generator module 301 facilitates a snapshot of all those parameters that profile a domain and that, if it is compromised, should be altered. When the information of the digital certificates and the certification chain is used to profile each domain, this technique is called certificate pinning. The fact that this feature is proposed to be executed from the remote server 300 offers a reliable solution that eludes possible attacks on the local machines from which the user 100 operates. The present invention proposes going beyond what the standard associated with certificate pinning offers. The goal is to offer an opinion on whether the site visited is really the one it says it is. To do so, the system has several data points from the visitor, and the response will be binary.

The data that can be obtained from the client 100 to perform the check will be: complete URL visited (not only the domain), language of the browser (country), IP range, certificate chain of the site visited and level of checking. There can be several types of checks or levels desired, which can be sent as parameters.

The remote server 300 is also used as a second visitor that, beyond detecting the attacks, compares whether the responses from different points are coherent, and therefore checks whether the user 100 is on a reliable network or if their responses are being manipulated. The possible cases of attack are MiTM attacks and traditional phishing.

MiTM with Certificate Pinning:

The present invention can be taken advantage of to cover the "gap" caused by the use of HSTS and HPKP. These protocols trust the first use in order to establish the pins and the TLS redirection in the browser. Starting from there, the browser itself is responsible for managing the security of the sites that have HPKP and HSTS. It is proposed that the remote server 300 simulates the very HPKP and stores the pins from the sites that it visits, such that the user 100 can trust in the pinning of the remote server 300 instead of doing it themselves, reducing the risk of being compromised. Thus, the risk of the certificate being invalid the first time a domain is visited is reduced, resolving the drawback of the HSTS and HPKP protocols. The remote server 300 is responsible for offering the user 100 this trust.

Furthermore, the present invention proposes that the remote server 300 can manage the security of the sites that have not implemented this security, replacing them. In an exemplary embodiment, the sequence would be as follows. The UE 200 sends the domain, language and certificate chain of the domain visited. Next, the signature generator module 301 that has previously visited these domains and conserves the pins, compares the pins, by country if possible. If not, it will do it according to the level of checking required. Level 0, 1, 2, 3, or 4 will indicate which certificate is to be checked, if it is the root, leaf, intermediate, all three or none of them. In the case of Spanish and English, the remote server 300 should store a structure like the following, not specifically associated with any user:

Domain1: es_ES(spkp1, spkp2, spkp3), en_US(spkp1, spkp2, spkp3)
Domain2: es_ES(spkp1, spkp2, spkp3), en_US(spkp1, spkp2, spkp3),
With spkp1, spkp2 and spsk3 being the pin of the root, leaf and intermediate certificate, respectively.

This structure could be provided by anyone or in any form: from lists of third parties to visits of the very remote server 300. Likewise, the user 100 would be able to update it dynamically.

MiTM Without Certificates:

The present invention in other exemplary embodiments can attempt to check whether the IP direction of the site visited is the usual one or at least, if it is in the same range. To do so, the UE 200 sends the domain, language and IP of the domain visited. Later, the remote server 300, which has previously visited these domains, and conserves the IP and the range thereof, performs an IP comparison, by country if possible. If not, it will do it according to the level of checking required. The level 0, 1, 2, 3 or 4 will indicate which certificate is to be checked, whether it be the exact IP, the range thereof (first, second octet . . . ), or nothing. In the case of Spanish and English languages, the remote server 300 should store a structure like this one:

Domain1: es_ES(IP), en_US(IP)
Domain2: es_ES(IP), en_US(IP).

Traditional Phishing:

Although the previous cases can protect from phishing, traditional phishing should be considered as the case wherein the domain is not the real one that is wanted to be visited. In these cases, the password introduced will fail, given that the local Domain Signature 210 will not be that of the authentic domain. In this case, Id_Hash=NULL is introduced and is iterated again in the process. This would require the Domain Signature associated with the domain to be retrieved legitimately and to be compared to the one obtained locally 210. If this comparison highlights any difference it will be able to be concluded that the domain was the victim of a spoofing attack.

One of the main advantages of the present invention is the high portability of the design thereof. A user 100 that has entrusted the management of their passwords to the solution proposed by the invention will be able to have several UEs 200 deployed through which they can introduce the passwords where they are requested. As commented previously, the idea is that the user 100 only needs to use one single master password (Master-Pass 101) and that the system is able to generate the suitable password for each environment, always the same one, starting from this master password (Master-Pass 101), from information identifying the domain from which the credentials are being requested (Web domain identifier 207) and of the user for that domain (User identifier 206). In order to make the proposed solution usable, the present invention opts to locally store this information upon considering that the possible exposure thereof does not compromise the identity of the user 100 in any case.

In a scenario where the user 100 will interact with multiple UEs 200, however, this does pose a problem since it will be necessary to ensure the coherence of the information that is stored locally in each of these UEs 200. Only by guaranteeing this coherence will the information used to request the generation of the passwords be the same in each of the UEs 200 used. Even though there are alternatives to automatically perform the updating, without the user 100 needing to participate actively, the present invention opts for an alternative where the user 100 must explicitly and temporally activate the sending of the most updated version of the data used to generate the input. In the design of the protocol that resolves this update the following objectives have been pursued:

Omitting any exchange of credentials which identify the user 100 before the system. Although it is necessary to identify the user 100 to construct a secure channel through which the information is sent, this identification is done based on the generation of one-time passwords (OTP) and it is opted for because the user 100 must be able to capture this OTP and introduce it into each of the UEs 200. This is coherent with the form wherein the sending of the OTP is usually resolved with an extra channel and does not provide novelties from the point of view of the innovative step of the invention. For this reason, the existing technological alternatives that resolve it will not be explained.

In order to preserve confidentiality, it opts for symmetric encryption based on the master key of the user (Master-Pass 101). In this environment it is assumed that the user 100 is the same in all the UEs 200, so it is not necessary to provide solutions that resolve the sharing of the key.

Reducing the time during which the information is outside the UEs 200. The information is always encrypted with the master key, but opting for an update structure wherein the user 100 triggers the update enables the proposed solution, regardless of whether or not the information has been received, to have a lifespan associated to the life of the OTP generated to define the exchange.

Figure 4:
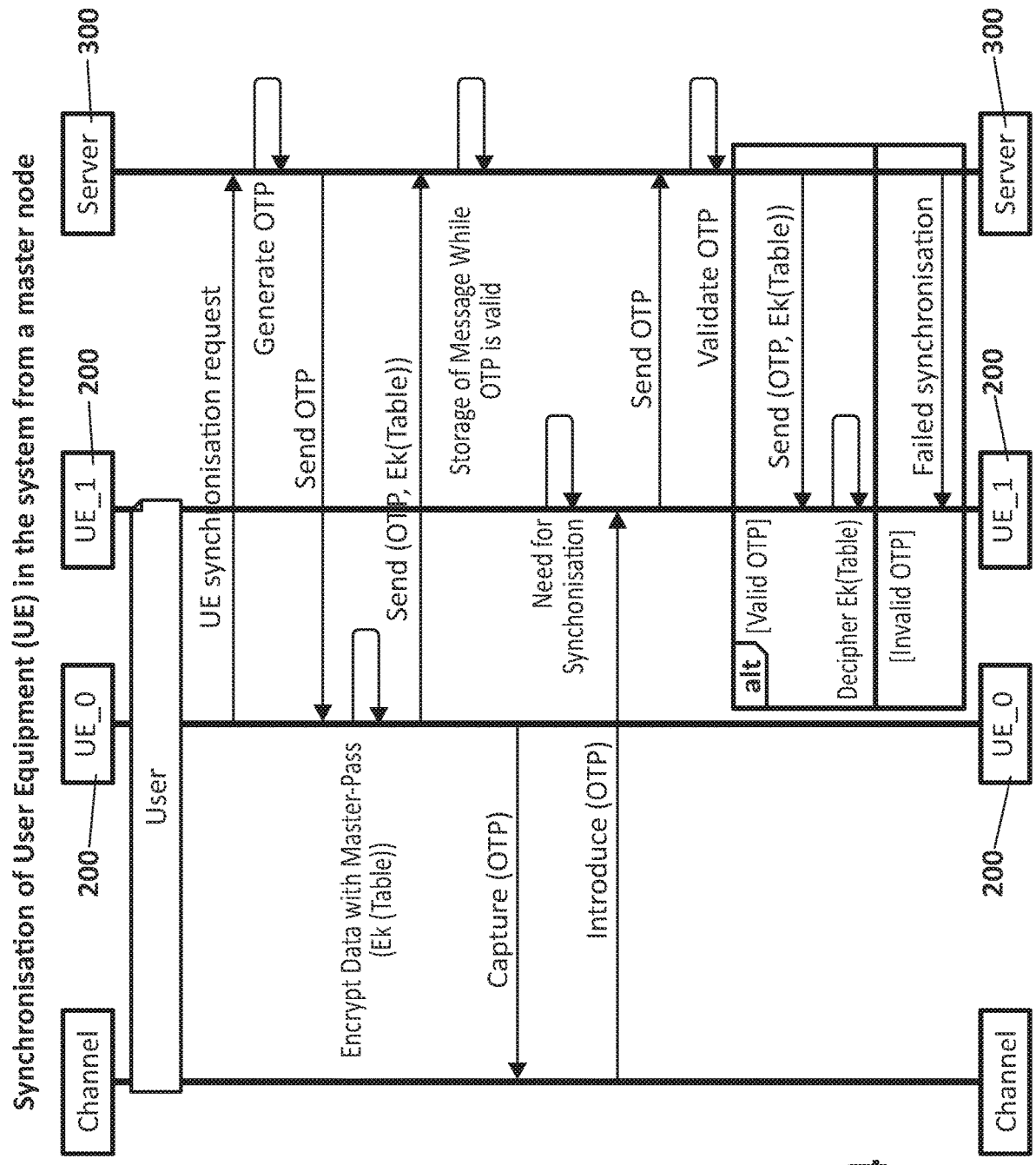
FIG. 4 is a flow chart which illustrates the synchronisation protocol proposed by the present invention for generating passwords between different User equipments (UEs).

In FIG. 4 an exemplary embodiment is illustrated of the information exchange that enables the updating of the system/method. It is important to note that this structure supports both the first time that a UE 200 different from the usual one is used and in the successive uses made of it. According to the example of FIG. 4, the user 100 using a UE_0 causes the propagation of the modifications in the information that the system uses to generate the input of the password generator (Password generator 302). With this stimulus, the remote server 300, through the synchronisation manager 303, generates a one-time password to which a limited lifespan is assigned and that will be used to construct a logical channel that only temporarily identifies the user 100 through the UEs 200 that will be used. This OTP is sent to UE_0 wherein two processes are performed: the first involves encrypting the information to be sent and, to do so, the master key (Master-Pass 101) is requested from the user 100. The result of the encryption process, together with the OTP that will temporarily identify the user 100 is sent to the remote server 300. The remote server 300 will store the message received during the lifespan of the OTP. The other process that must be facilitated in the UE_0 is the capture of the OTP for the transfer thereof to the UE that is to be updated. This capture can depend on the platform wherein the UE will be executed and can be based on a QR code, a chain of characters, etc.

Next, the user 100, this time from the UE_1, will request the synchronisation of the contents stored locally. The user 100 will then insert the OTP in this UE_1. UE_1 will then send this OTP to the remote server 300 which, after validating whether it matches the OTP that identifies a message to be sent, will perform the sending of said message. This sending does not cause the deletion of the message from the remote server 300, which will stay in the remote server 300 for the lifespan assigned to the OTP. Thus, the synchronisation of several UEs is facilitated. Upon receiving the message, the UE_1 will request that the user 100 introduce the master key in order to decrypt the contents. If it is a legitimate user they will have this key and the information will have been updated.

Thus, the present invention provides a solution for the management of passwords that is portable, prevents the storage of the passwords and warns about phishing attacks.

The proposed invention can be implemented in hardware, software, firmware or any combination thereof. If it is implemented in software, the functions can be stored in or encoded as one or more instructions or code in a computer-readable medium.

The computer-readable medium includes computer storage medium. The storage medium can be any available medium that can be accessed by means of a computer. By way of example, and not limitation, such computer-readable medium can compromise RAM, ROM, EEPROM, CD-ROM or another optical disc storage, magnetic disk storage or other magnetic storage devices, or any other medium that can be used to carry or store desired program code in the form of instructions or data structures and that can be accessed by means of a computer. Disk and disc as used in the present document include compact discs (CD), laser discs, optical discs, digital versatile discs (DVD), floppy disks and Blu-ray discs, wherein disks normally reproduce data magnetically, while discs reproduce data optically with lasers. Combinations of the aforementioned should also be included within the scope of a computer-readable medium. Any processor and the storage medium can reside in an ASIC. The ASIC can reside in a user terminal. As an alternative, the processor and the storage medium can reside as discrete components in a user terminal.

As used in the present document, the computer program products comprising computer-readable media include all the forms of computer-readable medium, except to the extent that said medium is considered to not be unestablished transitory propagating signals.

The scope of the present invention is defined in the attached claims.

The invention claimed is:

1. A computer-implemented method for generating passwords, wherein a user accesses by means of a first computation device, for the first time, a webpage or website identified by a web domain that requires an identification, by means of credentials including a user identifier and a password, of said user on said webpage or website, the method being characterised in that it comprises generating said password required by the webpage or website by means of performing the following steps:
  intercepting, by said first computation device, insertion of the credentials, when the user accesses said webpage or website;
  retrieving, by the first computation device, information referring to said web domain and said user identifier;
  generating, by the first computation device, a local signature (local Domain Signature), which identifies the domain that possesses the requested resource;
  checking, by the first computation device, if there is already a record for said web domain and for said user identifier in a database of the first computation device, and checking if a cryptographic value (Id_Hash) is different from zero;
  sending, by the first computation device, if a the result of said checking was false, information referring to the web domain and the user identifier to a remote server, so that the remote server generates a Domain Signature for that web domain;
  receiving, by the first computation device, from said remote server, the generated Domain Signature and generating a random value for said Id_Hash; and
  checking, by the first computation device, that the Domain Signature received from the remote server matches the local Domain Signature generated previously, and if they match, generating a necessary input so that a password generator module generates the password required by the webpage or web service by means of performing the following actions:
    i. requesting, by the first computation device, that the user introduce a master password (Master-Pass) into the first computation device;
    ii. executing, by the first computation device, a cryptographic mathematical function on the user identifier, the web domain identifier, the Id_Hash, the local Domain Signature and the requested Master-Pass, resulting in an encrypted value that is concatenated with password policies related to the cited domain;
    iii. sending, by the first computation device, the information resulting from said concatenation to said password generator module so that the password generator module generates the password required by the webpage or website by implementing a computational algorithm that uses the Master-Pass and the Id_Hash; and
    iv. receiving, by the first computation device, the password generated by the password generator module and directly, without storing it, inserting it into the webpage or website;
  accessing, by the user, the webpage or website with a second computation device, wherein said second computation device is synchronised with the first computation device through the introduction of a one-time password (OTP) into the second computation device, said OTP having been generated and transmitted to the second computation device previously by the remote server;
  sending, by the second computation device, the OTP to the remote server so that the remote server performs latter may perform the validation of the OTP;
  receiving, by the second computation device, if the result of said validation was correct, an encrypted message from the remote server,
  wherein said encrypted message includes said OTP and data associated with the webpage or website encrypted by means of the use of the Master-Pass, and
  wherein said data includes the user identifier, the web domain identifier and the Id_Hash; and
  requesting, by the second computation device, that the user introduce the Master-Pass in order to decrypt the contents of said encrypted message.

2. The computer-implemented method according to claim 1, wherein the password generator module is included in the remote server.

3. The computer-implemented method according to claim 1, wherein the password generator module is included in a dedicated computation program that is executed in the first computation device.

4. The computer-implemented method according to claim 1, wherein the password policies related to a cited domain include a minimum length that the generated password must have in relation to the number of uppercase and lowercase letters and/or to the number of digits and/or to the number of non-alphanumeric characters.

5. The computer-implemented method according to claim 1, comprising retrieving the password policies related to a cited domain directly from the cited domain.

6. The computer-implemented method according to claim 1, wherein the password policies related to a cited domain are defined by a user.

7. The computer-implemented method according to claim 1, wherein the password policies related to a cited domain are configured by the first computation device and stored in the database.

8. The computer-implemented method according to claim 1, wherein said computation algorithm comprises:
   generating a binary cryptographic function (Meta-Pass), starting from the combination of the Master-Pass and the Id_Hash; and
   performing a mapping of bits that make up the Meta-Pass with characters associated with the password policies relating to the cited domain.

9. The computer-implemented method according to claim 8, which further comprises:
   including random characters on a result obtained by said mapping in order to obtain a password that meets a predetermined length according to said password policies relating to a cited domain; and
   mixing the characters that make up said password, the password having a predetermined length.

10. The computer-implemented method according to claim 1, wherein said step iv) further comprises storing, by the first computation device, in the database and associated with the user identifier and the web domain identifier, the Id_Hash associated with the credentials of the user for the webpage or website.

11. The computer-implemented method according to claim 10, characterised in that when the user, by means of the first computation device, accesses the webpage or website for a second time, the first computation device comprises:
   intercepting said second access of the webpage or website and retrieving the information referring to the web domain and to the user identifier;
   generating a new local Domain Signature for the web domain and comparing said local Domain Signature generated with the previously generated local Domain Signature;
   checking if there is already a record for said web domain and for said user identifier in the database and also checking if the Id_Hash is different from zero;
   if the result of said checking was true, requesting that the user introduce the Master-Pass into the first computation device;
   executing a cryptographic mathematical function on the user identifier, the web domain identifier, the Id_Hash, the local Domain Signature and the requested Master-Pass, giving as a result an encrypted value that is concatenated with the password policies relating to the cited domain; and
   sending the information resulting from said concatenation to the password generator module so that the password generator module generates the password required by the webpage or website.

12. A non-transitory computer-readable medium that includes computer-executable code that, when executed by a processor, causes the processor to perform the method according to claim 1.

* * * * *